US012590933B2

(12) United States Patent
Yamazaki

(10) Patent No.: US 12,590,933 B2
(45) Date of Patent: Mar. 31, 2026

(54) PREPARATIVE SEPARATION AND PURIFICATION DEVICE AND PREPARATIVE SEPARATION AND PURIFICATION METHOD

(71) Applicant: Shimadzu Corporation, Kyoto (JP)

(72) Inventor: Tomoyuki Yamazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1045 days.

(21) Appl. No.: 17/397,142

(22) Filed: Aug. 9, 2021

(65) Prior Publication Data

US 2021/0396720 A1      Dec. 23, 2021

Related U.S. Application Data

(62) Division of application No. 15/750,856, filed as application No. PCT/JP2016/065218 on May 23, 2016, now abandoned.

(30) Foreign Application Priority Data

Oct. 2, 2015      (JP) ................................. 2015-196573

(51) Int. Cl.
*G01N 30/38*          (2006.01)
*B01D 15/14*          (2006.01)
(Continued)

(52) U.S. Cl.
CPC ............. *G01N 30/38* (2013.01); *B01D 15/14* (2013.01); *B01D 15/161* (2013.01); *B01D 15/163* (2013.01); *B01D 15/247* (2013.01); *G01N 30/32* (2013.01); *G01N 30/80*

(2013.01); *G01N 30/84* (2013.01); *G01N 2030/085* (2013.01); *G01N 2030/328* (2013.01); *G01N 2030/385* (2013.01)

(58) Field of Classification Search
None
See application file for complete search history.

(56) References Cited

U.S. PATENT DOCUMENTS

2010/0326909 A1* 12/2010 Vogeser ................. G01N 30/08
422/68.1

FOREIGN PATENT DOCUMENTS

| JP | 2003-149217 A | 5/2003 |
| WO | 2009/044425 A1 | 4/2009 |
| WO | 2009/044426 A1 | 4/2009 |

OTHER PUBLICATIONS

International Search Report dated Aug. 16, 2016 of corresponding International application No. PCT/JP2016/065218; 2 pgs.
(Continued)

*Primary Examiner* — Kara M Peo
(74) *Attorney, Agent, or Firm* — Maier & Maier, PLLC

(57)          ABSTRACT

A target component is collected using a preparative separation and purification device having a holder for holding a trap column in which the target component has been captured, a liquid feeder for feeding a first solvent having compatibility with the water remaining in the trap column and a second solvent having low compatibility with water and high compatibility with the first solvent into the trap column, a flow-path switch for connecting the exit end of the trap column to a waste liquid flow path and a collection flow path, and a control unit for controlling the flow-path switch so that solution including water flows into the waste liquid flow path.

3 Claims, 4 Drawing Sheets

(51) Int. Cl.
    *B01D 15/16*     (2006.01)
    *B01D 15/24*     (2006.01)
    *G01N 30/08*     (2006.01)
    *G01N 30/32*     (2006.01)
    *G01N 30/80*     (2006.01)
    *G01N 30/84*     (2006.01)

(56)            References Cited

OTHER PUBLICATIONS

Written Opinion of the International Search Authority dated Aug. 16, 2016 of corresponding International application No. PCT/JP2016/065218; 8 pgs.
International Preliminary Report on Patentability issued on Apr. 3, 2018 in corresponding International application No. PCT/JP2016/065218; 6 pages.
English Machine Translation of WO2009/044426 by Shimadzu (Year: 2009).

* cited by examiner

WATER

CH₃CN

WATER

DCM

CH₃CN

DCM

DCM

DCM

FIG.4a
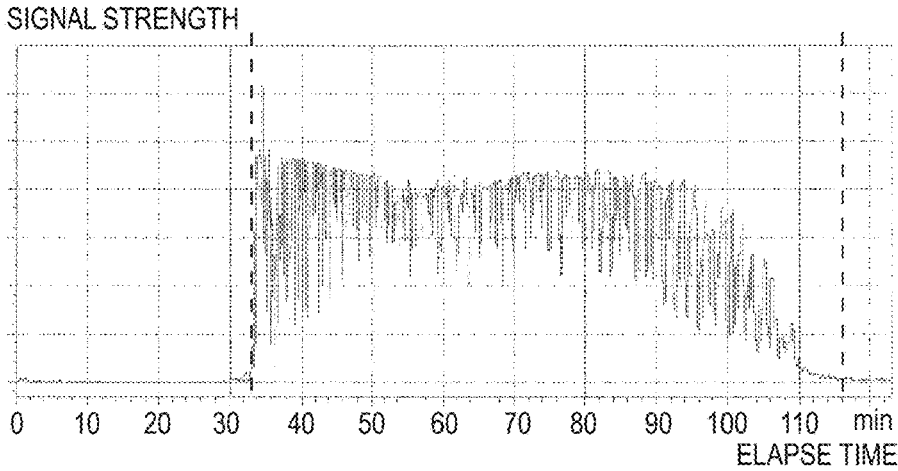
FIG.4b
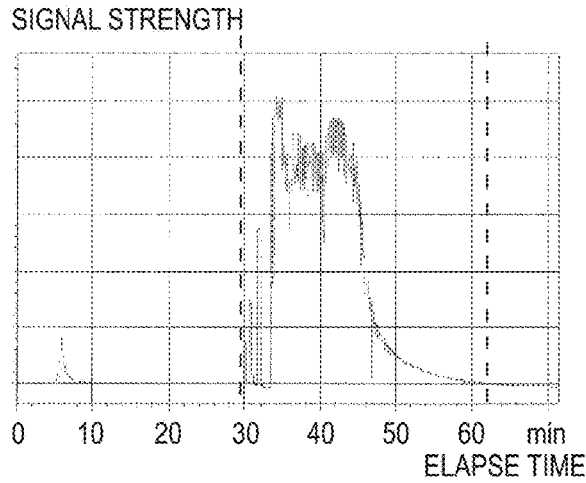
FIG.4c

PREPARATIVE SEPARATION AND PURIFICATION DEVICE AND PREPARATIVE SEPARATION AND PURIFICATION METHOD

CROSS-REFERENCE TO RELATED APPLICATIONS

This application is a divisional of U.S. application Ser. No. 15/750,856, filed Feb. 7, 2018, which is a national phase of International Application No. PCT/JP2016/065218, filed May 23, 2016, which claims priority to Japanese Application No. 2015-196573, filed Oct. 2, 2015, the entire contents of which are incorporated herein by reference.

FIELD

The present invention relates to a preparative separation and purification device which separates and collects one or plural components included in a solution by using a liquid chromatograph.

BACKGROUND

In a pharmaceutical field, a preparative separation and purification system using a liquid chromatograph has been used in order to store various compounds obtained by chemical synthesis as a library or collect samples for detailed analysis. As such a preparative separation and purification system, systems described in Patent Document 1 and Patent Document 2 are known.

In the preparative separation and purification systems disclosed in Patent Documents 1 and 2, a target component (compound) in a sample solution is temporally separated by a liquid chromatograph to introduce the target component into a separate trap column for each target component so that the target component is trapped therein. Then, a solvent (an elution solvent) flows into each trap column to elute the target component trapped inside the column. Accordingly, a solution including a high concentration of the target component is sampled by a container (a collection container) and an evaporating and drying process is performed on each solution to remove the solvent therefrom. Thus, the target component is collected as a solid.

The evaporating and drying process is generally performed by a method of heating or centrifugally separating a collected solution. However, it takes several hours to about one day only by the evaporating and drying process in such a method. In the pharmaceutical field, it is necessary to search for compounds with medicinal effects among many synthetic compounds. For this reason, there have been various attempts to improve the efficiency for the purpose of shortening analysis time by increasing a speed of analysis equipment and optimizing an analysis method. Since the evaporating and drying process is one of the most time consuming processes in all compound searching processes, it is important to shorten the process time in order to improve the efficiency.

As a factor of taking time in the evaporating and drying process, a case where water is mixed in the solution sampled by the collection container is exemplified. As a solvent for eluting the target component trapped in the trap column, an organic solvent is generally used. Since the organic solvent has a lower boiling point than water and has high volatility, the time required for the evaporating and drying process can be shortened if the solution collected in the collection container is the one in which the target component is dissolved in the organic solvent. However, in the liquid chromatograph, since the target component is generally introduced into the trap column together with water or a mobile phase including water as a main component to be trapped therein, a large amount of water is stored in the trap column at a time point in which the target component is completely trapped. Even when the organic solvent is introduced into the trap column and the target component is eluted from the trap column in such a state, it is difficult to extract only the organic solvent and the target component from the trap column. Thus, water is mixed with the solution sampled in the collection container.

On the contrary, Patent Document 3 discloses a preparative separation and purification device in which an aqueous solvent stored in a trap column is eliminated before the elution of the target component from the trap column. In the preparative separation and purification device, an organic solvent having a higher specific gravity than the aqueous solvent included in the trap column and having low compatibility with the aqueous solvent is used as a solvent (an elution solvent) for eluting the target component from the trap column. Then, the elution solvent is introduced from the lower end of the trap column while the target component is trapped in the trap column. Accordingly, the aqueous solvent having a lower specific gravity than the elution solvent is pushed upward by the elution solvent to be discharged first from the trap column and then the target component is dissolved in the elution solvent to be discharged from the trap column. By discarding the aqueous solvent which flows out first, a solution in which the target component is dissolved only in the organic solvent (the elution solvent) can be collected.

Patent Document 1: JP-A-2003-149217
Patent Document 2: International Patent Publication No. WO2009/044425
Patent Document 3: International Patent Publication No. WO2009/044426

SUMMARY

In the preparative separation and purification device disclosed in Patent Document 3, since the aqueous solvent is pushed upward by the elution solvent having low compatibility with the aqueous solvent, the vicinity of the boundary between both solvents becomes an emulsion in which the elution solvent is suspended in the aqueous solvent. Since the target component trapped in the trap column is also dissolved in the elution solvent in the emulsion, it is desirable to sample the emulsion into the collection container in order to improve the target component collection efficiency. However, in that case, a problem arises in that water is included in the solution sampled in the collection container.

An object to be attained by the invention is to improve target component collection efficiency of a preparative separation and purification device, allowing a solvent having a high elution force to flow through a trap column and eluting a target component trapped in the column to be collected while a large amount of water remains in the trap column, while preventing water from being mixed with a collected solution.

An aspect of the invention solving the above-described problems is a preparative separation and purification device for allowing a solution including a target component and a trapping solvent to flow through a trap column to trap the target component in the trap column and allowing a solvent different from the trapping solvent to flow through the trap column to collect the target component trapped in the trap column, including: a) a holding means for holding the trap column so that an entrance end of the trap column is directed downward and an exit end thereof is directed upward; b) a liquid feeding means selectively connected to a first solvent source storing a first solvent having a lower boiling point than the trapping solvent and having compatibility with the trapping solvent remaining in the trap column and a second solvent source storing a second solvent having a lower boiling point than the trapping solvent, having a higher specific gravity than the trapping solvent and the first solvent, having high compatibility with the first solvent, and having low compatibility with the trapping solvent while the target component is trapped in the trap column held by the holding means and feeding any one of the first solvent and the second solvent to the entrance end of the trap column; c) a liquid feed control means for connecting the liquid feeding means to the second solvent source so that the second solvent flows through the trap column after connecting the liquid feeding means to the first solvent source for a prede- termined time so that the first solvent flows through the trap column while the target component is trapped in the trap column held by the holding means and the trapping solvent remains in the trap column; d) a flow-path switching means for selectively connecting the exit end of the trap column to any one of a waste liquid flow path and a collection flow path; and e) a flow-path control means for controlling the flow-path switching means so that the exit end is connected to the waste liquid flow path when a solution including the trapping solvent is discharged from the exit end of the trap column, the exit end is connected to the collection flow path when a solution including the second solvent is discharged from the exit end of the trap column, and a connection destination of the exit end is switched from the waste liquid flow path to the collection flow path at a predetermined timing until a solution including the second solvent starts to be discharged after a solution including the first solvent is discharged from the exit end of the trap column.

Further, another aspect of the invention solving the above- described problems is a preparative separation and purifi- cation method of allowing a solution including a target component and a trapping solvent to flow through a trap column to trap the target component in the trap column and allowing a solvent different from the trapping solvent to flow through the trap column to collect the target component trapped in the trap column, including: a) feeding a first solvent having a lower boiling point than the trapping solvent and having compatibility with the trapping solvent remaining in the trap column to an entrance end of the trap column for a predetermined time while the target component is trapped in the trap column held so that the entrance end of the trap column is directed downward and an exit end thereof is directed upward; b) feeding a second solvent having a lower boiling point than the trapping solvent, a higher specific gravity than the trapping solvent and the first solvent, having high compatibility with the first solvent, and having low compatibility with the trapping solvent to the entrance end of the trap column; and c) allowing a solution including the trapping solvent to flow through a waste liquid flow path when the solution is discharged from the exit end of the trap column, allowing a solution including the second solvent to flow through a collection flow path when the solution is discharged from the exit end of the trap column, and switching the flow path of the solution discharged from the exit end from the waste liquid flow path to the collection flow path at a predetermined timing until the solution including the second solvent starts to be discharged after a solution including the first solvent is discharged from the exit end of the trap column.

Here, the trapping solvent mainly indicates a mobile phase used for separating the target component from the solution including various components in the liquid chro- matograph, but may also include a cleaning liquid used for cleaning or purifying the column after trapping the target component in the trap column. In general, the trapping solvent is water alone or an aqueous solvent including water as a main component. Further, the first solvent is a solvent which satisfies the above-described conditions of the com- patibility, the specific gravity, and the boiling point with respect to the trapping solvent and the second solvent. For example, the solvent is acetonitrile (specific gravity: 0.71, boiling point: 81.6° C.), methanol (specific gravity: 0.79, boiling point: 64.7° C.), or an organic solvent corresponding to a mixed liquid thereof. Further, the second solvent is a solvent which satisfies the above-described conditions of the compatibility, the specific gravity, and the boiling point with respect to the trapping solvent and the first solvent. For example, the solvent is dichloromethane (specific gravity: 1.32, boiling point: 39.6° C.) or an organic solvent corre- sponding to a mixed liquid including the dichloromethane. The mixed liquid is obtained by mixing, for example, methanol with dichloromethane in order to adjust an elution force or solubility of the compound. Both the first solvent and the second solvent are solvents capable of eluting the target component, but the second solvent having a stronger elution force than the first solvent is used.

In the preparative separation and purification device according to the invention, in a state where the target component is trapped by an absorbent in the trap column and the trapping solvent is accumulated in the trap column, the first solvent is fed by the liquid feeding means and the first solvent is transferred from the lower end of the trap column thereinto. The trapping solvent in the trap column is pressed upward as the liquid level of the first solvent in the trap column increases, but since the first solvent has compatibil- ity with the trapping solvent, both solvents are dissolved in the vicinity of the boundary between the trapping solvent and the first solvent. When a predetermined time elapses after the first solvent starts to be introduced into the trap column, the feeding of the first solvent using the liquid feeding means is stopped. Here, the "predetermined time" depends on the feed speed of the first solvent, but the first solvent may be introduced into the trap column by an amount capable of preventing a contact between both sol- vents while being interposed between the trapping solvent and the second solvent in the trap column. Next, the second solvent is transferred into the trap column from the lower end of the trap column by the liquid feeding means and the trapping solvent and the first solvent are pushed upward in the trap column as the liquid level of the second solvent in the trap column increases. At this time, since the second solvent has high compatibility with the first solvent, both solvents are dissolved in the vicinity of the boundary between the second solvent and the first solvent.

As described above, the trapping solvent is first dis- charged from the exit end of the trap column as the first solvent and the second solvent are introduced into the trap column. At this time, the solution discharged from the trap column flows through the waste liquid flow path and the trapping solvent is discarded. When all the trapping solvent in the trap column is discharged, the first solvent is con- tinuously discharged from the exit end of the trap column. When a predetermined time elapses after the first solvent starts to be discharged from the trap column, the flow-path control means controls the flow-path switching means so that the solution discharged from the trap column flows through the collection flow path. Accordingly, the target component included in the first solvent is extracted from the trap column to be collected. Next, the solvent discharged from the trap column is switched from the first solvent to the second solvent, but since the solution discharged from the trap column continuously flows through the collection flow path, the target component trapped in the trap column is eluted by the second solvent having a strong elution force so that the target component can be extracted therefrom to be collected.

Advantageous Effects of the Invention

According to the preparative separation and purification device of the invention, since the timing of starting the collection of the solution discharged from the trap column is advanced while discharging the trapping solvent such as water or an aqueous solvent remaining in the trap column before eluting the target component from the trap column trapping the target component, it is possible to improve the target component collection efficiency and to prevent the trapping solvent from being included in the solution including the collected target component. Further, since the boiling points of the collected first and second solvents are lower than the trapping solvent, the evaporating and drying process in the subsequent step can be performed within a short time.

BRIEF DESCRIPTION OF THE DRAWINGS

FIG. 4*a* shows a diagram showing an elution time a case where acetonitrile is not used.

FIG. 4*b* shows a diagram showing an elution time a case where 1 mL of acetonitrile is used.

FIG. 4*c* shows a diagram showing an elution time a case where 2 mL of acetonitrile is used.

Hereinafter, a mode for carrying out the invention will be described with reference to the drawings.

EMBODIMENT

Figure 1:
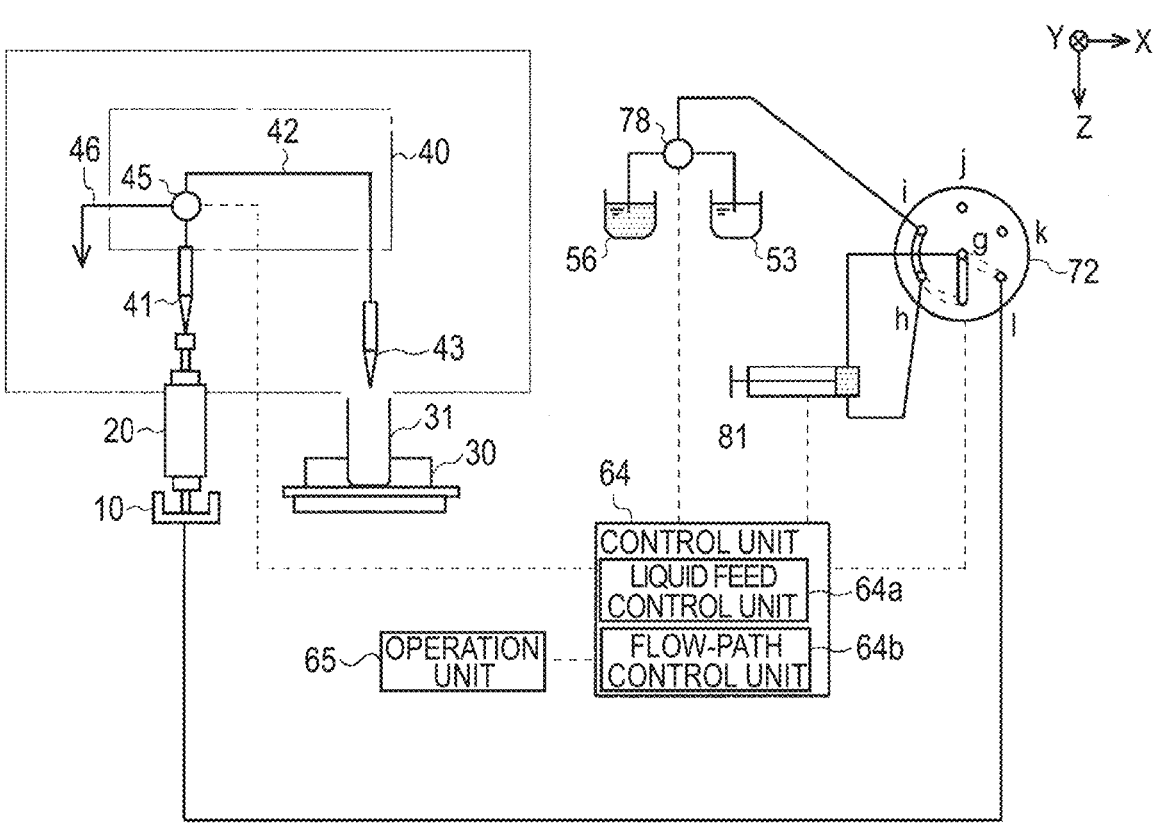
FIG. 1 is a schematic configuration diagram of a preparative separation and purification device according to an embodiment of the invention.

FIG. 1 is a schematic configuration diagram of a preparative separation and purification device according to an embodiment of the invention. The preparative separation and purification device is a device for collecting a target component separated by a preparative liquid chromatograph device (not illustrated) and trapped by an absorbent filled in a trap column from the trap column.

A column rack 10 (a holding means of the invention) uprightly holds a trap column 20 while an entrance end is directed downward and an exit end is directed upward. In addition, a target component which is separated in advance by a preparative liquid chromatograph (not illustrated) is trapped by the trap column 20.

A collection container rack 30 stores a collection container 31 for collecting a target component eluted from the trap column 20.

A collection head 40 which sends the liquid eluted from the trap column 20 to the collection container 31 is provided above the column rack 10 and the collection container rack 30. The collection head 40 includes a collection flow path 42 and an elution liquid collection needle 41 and a discharge nozzle 43 which are respectively connected to both ends of the collection flow path 42 while front ends thereof are directed downward. Further, the collection flow path 42 is provided with a discharge/recovery switching valve 45 (a flow-path switching means of the invention) which determines whether to send a liquid flowing into the collection flow path 42 from the elution liquid collection needle 41 to a waste liquid flow path 46 extending to a waste liquid port or the discharge nozzle 43. In addition, the collection head 40 can be moved in the vertical direction (the Z-axis direction of the drawing), the longitudinal direction (the Y-axis direction of the drawing), and the horizontal direction (the X-axis direction of the drawing) by a driving mechanism (not illustrated).

A low-pressure valve 72 includes one port g provided at a center and five ports h to l provided in the periphery thereof, the port g can be connected to any one of the ports h to l and two adjacent ports among the ports h to l can communicate with each other. The port g is connected to one end of a plunger pump 81 (a liquid feeding means of the invention) and the port h is connected to the other end of the plunger pump 81. Further, the port i is connected to a solvent switching valve 78. The port l is connected to the entrance end of the trap column 20.

A first solvent reservoir 53 (a first solvent source of the invention) stores acetonitrile which is a first solvent of the invention and a second solvent reservoir 56 (a second solvent source of the invention) stores dichloromethane which is a second solvent of the invention. The solvent switching valve 78 is used to switch the flow path so that any one of these solvents flows into the plunger pump 81.

A control unit 64 configured as a CPU and the like includes a liquid feed control unit 64*a* (a liquid feed control means of the invention) and a flow-path control unit 64*b* (a flow-path control means of the invention) and the plunger pump 81 (a flow rate or a flow velocity) and the discharge/recovery switching valve 45 are respectively controlled according to a program set in advance. Further, the control unit 64 automatically performs a preparative separation and purification operation by switching valves such as the low-pressure valve 72 and the solvent switching valve 78 or controlling a driving mechanism (not illustrated). Further, an operation unit 65 is used to input and set a condition for a preparative separation and purification operation. In addition, a connection between the control unit 64 and each of devices is indicated by a dashed line in the drawing.

Figure 2:
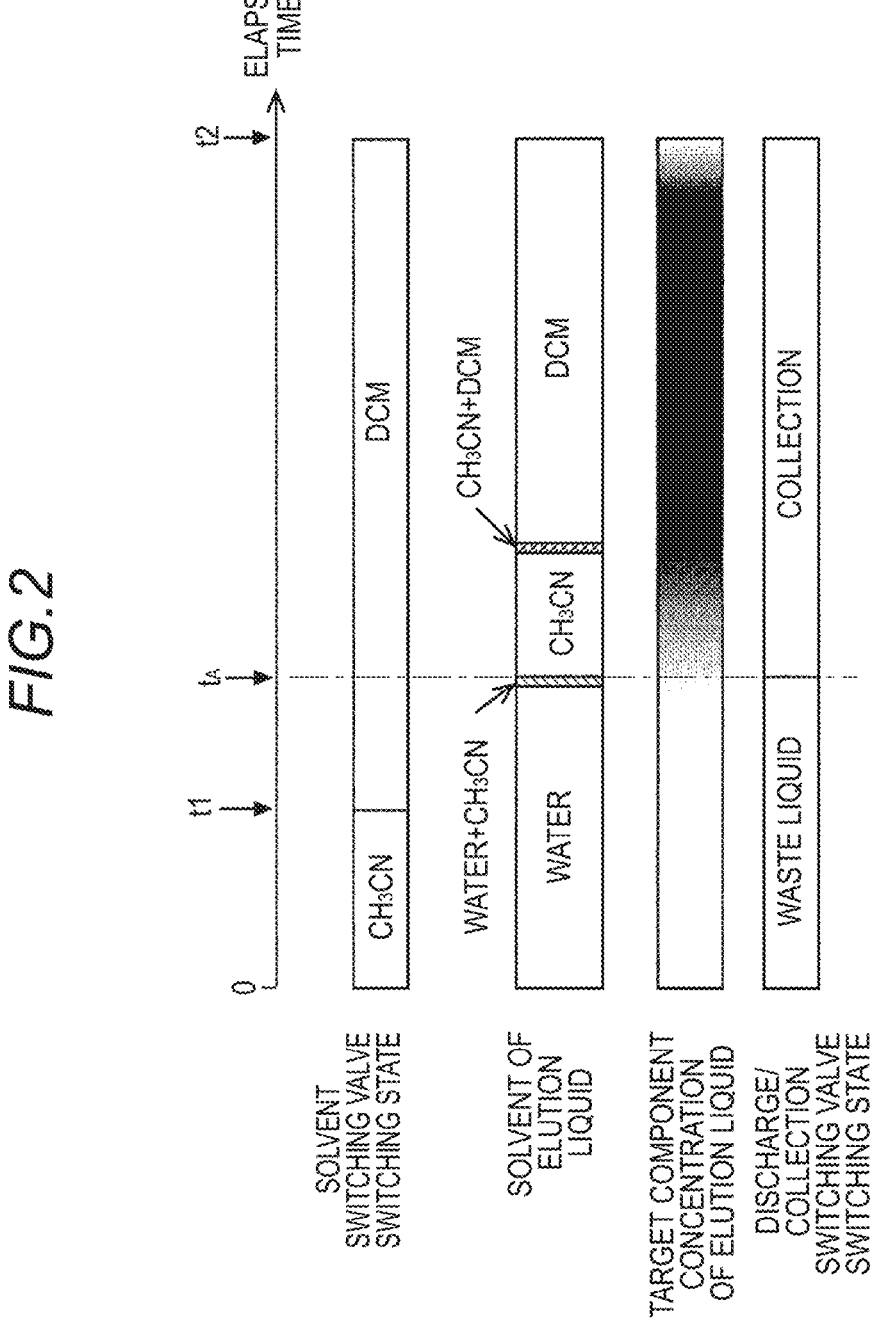
FIG. 2 is a diagram for describing a change in solvent and target component in an elution liquid from a trap column.

A procedure of collecting a target component using the preparative separation and purification device according to the embodiment will be described with reference to FIGS. 1 to 3. FIG. 2 is an example of a process timetable of the trap column 20, the discharge/recovery switching valve 45, and the solvent switching valve 78 according to the embodiment.

First, a user sets the trap column 20 having a target component trapped in advance therein to the column rack 10. Water which is a trapping solvent of the invention is filled in the trap column 20. After the trap column 20 is set, a process start is instructed to the control unit 64 from the operation unit 65.

The control unit 64 drives a driving mechanism (not illustrated) to move the collection head 40 so that the elution liquid collection needle 41 and the discharge nozzle 43 are respectively inserted into the exit end of the trap column 20 and the collection container 31. At this time, the flow-path control unit 64b switches the discharge/recovery switching valve 45 so that a liquid flowing into the elution liquid collection needle 41 flows through the waste liquid flow path 46. Further, the control unit 64 switches the low-pressure valve 72 and the solvent switching valve 78 and the liquid feed control unit 64a drives the plunger pump 81 so that a first solvent which is herein acetonitrile (indicated by $CH_3CN$ in the drawing) inside the first solvent reservoir 53 is supplied from the entrance end of the trap column 20.

Figure 3A:
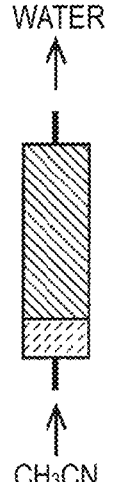
FIG. 3*a* is a first schematic diagram for describing a change in solvent in the trap column.

Since the acetonitrile is fed into the trap column 20, the liquid level of the acetonitrile gradually rises from a lower end (FIG. 3a). Accordingly, the water inside the trap column 20 can be pushed upward, but since the acetonitrile has compatibility with water, both solvents are dissolved in the vicinity of the boundary thereof. Meanwhile, the water which is pushed upward overflows from the exit end of the trap column 20 and flows to the outside from the waste liquid flow path 46 through the elution liquid collection needle 41 and the discharge/recovery switching valve 45.

The liquid feed control unit 64a stops the feeding of the liquid using the plunger pump 81 after the acetonitrile is fed by a predetermined time t1 and switches the entrance of the solvent switching valve 78 to the second solvent reservoir 56. Then, the plunger pump 81 is driven again to start the feeding of a second solvent (dichloromethane (indicated by DCM in the drawing)) to the trap column 20.

Figure 3B:
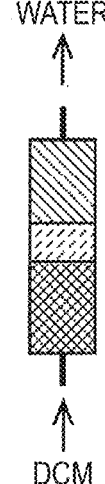
FIG. 3*b* is a second schematic diagram for describing a change in solvent in the trap column.

When the dichloromethane is fed into the trap column 20, since the dichloromethane has compatibility with acetonitrile, both solvents are dissolved in the vicinity of the boundary thereof. Further, since the dichloromethane is fed into the trap column 20, the water and the acetonitrile inside the trap column 20 can be further pushed upward and the water is discharged to the outside from the waste liquid flow path 46 (FIG. 3b). Further, since the acetonitrile has an elution force, a target component trapped in the adsorbent of the trap column 20 starts to be eluted to the acetonitrile.

Figure 3C:
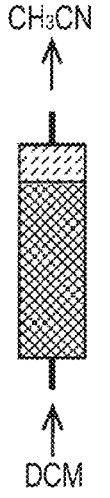
FIG. 3*c* is a third schematic diagram for describing a change in solvent in the trap column.

The flow-path control unit 64b estimates a time $t_A$ from the start of the feeding of the dichloromethane until the start of the discharge of the acetonitrile based on the void volume inside the trap column 20, that is, the capacity of the water and the acetonitrile stored in the trap column 20 immediately before the introduction of the second solvent (dichloromethane) and the feed flow rate of the dichloromethane using the plunger pump 81, and determines whether an elapse time from the start of the feeding of the dichloromethane reaches the time $t_A$. Further, since the target component is eluted to the acetonitrile, the target component starts to be included in the discharged solution at the same time when the acetonitrile starts to be discharged from the trap column 20 (FIG. 3c).

When the flow-path control unit 64b determines that the elapse time from the start of the feeding of the dichloromethane reaches the time $t_A$, the exit of the discharge/recovery switching valve 45 is switched from the waste liquid flow path 46 to the discharge nozzle 43 so that the collection of the elution liquid from the trap column 20 starts (a time indicated by the one-dotted chain line in FIG. 2).

Figure 3D:
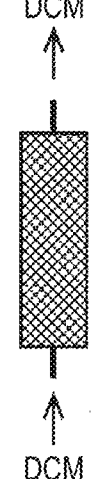
FIG. 3*d* is a fourth schematic diagram for describing a change in solvent in the trap column.

The dichloromethane is continuously fed even after that time so that the inside of the trap column 20 is filled with the dichloromethane and the dichloromethane is discharged from the exit end of the trap column 20 (FIG. 3d). Since the target component is also eluted to the dichloromethane, it is possible to collect the target component by the collection in the collection container 31.

Then, the liquid feed control unit 64a determines whether the elapse time from the start of the feeding of the dichloromethane to the trap column 20 reaches a set time t2. The set time t2 is a value set in advance and is a time until the target component is completely eluted from the trap column 20 from the start of the feeding of the dichloromethane based on an experiment or calculation in the embodiment. The control unit 64 stops the plunger pump 81 when it is determined that the set time t2 has elapsed.

As described above, according to the preparative separation and purification device of the embodiment, it is possible to collect the dichloromethane and acetonitrile containing the target component to the collection container while discarding the water inside the trap column 20 to the waste liquid flow path.

Next, an experiment which is carried out to investigate a target component elution profile using the preparative separation and purification device according to the embodiment will be described. The experiment was carried out in a state where an absorbent formed by porous polymer, specifically, styrene divinylbenzene type polymer having a particle diameter of 20 to 30 μm was filled into the trap column 20, 100 mg of caffeine corresponding to a target component was trapped by the absorbent, and water corresponding to the trapping solvent was filled in the trap column 20. In this state, acetonitrile corresponding to the first solvent and dichloromethane corresponding to the second solvent were respectively fed at 0.5 mL/min and the concentration of the target component in the solution discharged from the elution liquid collection needle was measured by a detector.

A measurement result is shown in FIGS. 4a to 4c. FIG. 4a shows a measurement result of a comparative experiment in which elution is carried out using only dichloromethane and FIGS. 4b and 4c respectively show an elution result of elution using 1 mL and 2 mL of acetonitrile and dichloromethane. Even in any diagram, the horizontal axis indicates the elapse time and the vertical axis indicates the signal strength of the detector. There is a disturbance in the waveform, but this is due to bubbles generated from the adsorbent when dichloromethane is fed. As shown in FIG. 4a, the elution time in the case of the elution without using acetonitrile is about 80 minutes. In contrast, the elution time at the time of using 1 mL of acetonitrile as the first solvent is about 30 minutes as shown in FIG. 4b and the elution time at the time of using 2 mL of acetonitrile as the first solvent is about 25 minutes as shown in FIG. 4c. Accordingly, the elution time is largely shortened. From such a measurement result, it is understood that acetonitrile promotes the elution of the target component.

Since the styrene divinylbenzene type polymer is swollen by the acetonitrile, the target component trapped by the polymer is easily taken. Thus, it is considered that the elution time is shortened when dichloromethane having a strong elution force flows in this state.

In addition, since the above-described embodiment is merely an example, appropriate modification, correction, and addition in the scope of the invention are also included in the scope of claims. For example, in the embodiment, the target component is collected in the collection container while the second solvent is fed, but the target component may be collected in the collection container while the first solvent is fed. In the above-described embodiment, since the first solvent feed time is short, the feeding of the second solvent is started before the first solvent is discharged from the exit end of the trap column, but when the first solvent feed time is long or the capacity of the trap column is small, there is a case where the first solvent is discharged from the trap column while the first solvent is fed. In such a case, the discharge/recovery switching valve is switched even in a state where the first solvent is fed so that the first solvent is collected in the collection container.

In the above-described embodiment, a solution starts to be collected in the collection container after acetonitrile corresponding to the first solvent starts to be discharged from the exit end of the trap column, but a solution may start to be collected after dichloromethane starts to be discharged.

Since the trapping solvent and the first solvent have compatibility, both solvents are dissolved in the vicinity of the boundary thereof. When the first solvent feed amount is small or a large amount of the trapping solvent is dissolved in the first solvent, most of the first solvent is dissolved with the trapping solvent. In this state, when the first solvent is fed to the collection container, the amount of the trapping solvent in the collected solution increases. Meanwhile, since the compatibility between the trapping solvent and the second solvent is low, both solvents are not substantially dissolved. Thus, when a large amount of the trapping solvent is dissolved in the first solvent, it is possible to prevent the trapping solvent from being included in the collected solution by collecting only the second solvent.

Further, in the above-described embodiment, the solvent in the vicinity of the boundary between the trapping solvent (water) and the first solvent, that is, the solution in which the trapping solvent and the first solvent are dissolved is not collected, but the solution may start to be collected in the collection container when the solution passes through the exit end of the trap column. Since the first solvent elutes the target component, the target component is also eluted to the solvent near the boundary. Thus, it is possible to further improve the target component collection efficiency by collecting the solvent.

The invention claimed is:

1. A preparative separation and purification method, comprising:

providing a trap column having a target component trapped therein, wherein a trapping solvent for trapping the target component remains in the trap column;

feeding a first solvent, wherein the first solvent is acetonitrile, to an entrance end of the trap column for a predetermined time while the target component is trapped in the trap column held so that the entrance end of the trap column is directed downward and an exit end thereof is directed upward, the first solvent having a lower boiling point than the trapping solvent, having compatibility with the trapping solvent, and promoting elution of the target component by swelling an adsorbent within the trap column;

after the predetermined time, feeding a second solvent, wherein the second solvent is dichloromethane, to the entrance end of the trap column, the second solvent having a lower boiling point than the trapping solvent, a higher specific gravity than the trapping solvent and the first solvent, and a higher compatibility with the first solvent than with the trapping solvent; and allowing a solution including the trapping solvent to flow through a waste liquid flow path when the solution is discharged from the exit end of the trap column, allowing a solution including the second solvent to flow through a collection flow path when the solution is discharged from the exit end of the trap column, and switching the flow path of the solution discharged from the exit end from the waste liquid flow path to the collection flow path at a predetermined timing until the solution including the second solvent starts to be discharged after a solution including the first solvent is discharged from the exit end of the trap column.

2. The preparative separation and purification method according to claim 1, wherein each of the first solvent and the second solvent has an elution force to the target component.

3. The preparative separation and purification method according to claim 1, wherein the trapping solvent is an aqueous solvent, and wherein each of the first solvent and the second solvent is an organic solvent.

* * * * *